(12) United States Patent
Gaudry et al.

(10) Patent No.: US 7,029,527 B2
(45) Date of Patent: Apr. 18, 2006

(54) QUICK BINDER FOR SELF COMPACTING CONCRETE, USE AND APPLICATION OF SAME

(75) Inventors: Laurent Gaudry, l'Isle d'Abeau (FR); Christian Marez, Bourgoin Jallieu (FR)

(73) Assignee: Lafarge Aluminates, Paris (FR)

( * ) Notice: Subject to any disclaimer, the term of this patent is extended or adjusted under 35 U.S.C. 154(b) by 0 days.

(21) Appl. No.: 10/311,865

(22) PCT Filed: Jun. 19, 2001

(86) PCT No.: PCT/FR01/01920

§ 371 (c)(1),
(2), (4) Date: Jul. 14, 2003

(87) PCT Pub. No.: WO01/98229

PCT Pub. Date: Dec. 27, 2001

(65) Prior Publication Data

US 2004/0099185 A1    May 27, 2004

(30) Foreign Application Priority Data

Jun. 20, 2000 (FR) .................................. 00 7870

(51) Int. Cl.
C04B 28/04 (2006.01)
C04B 24/00 (2006.01)

(52) U.S. Cl. ...................... 106/695; 106/717; 106/735; 106/806

(58) Field of Classification Search ................ 196/695; 106/695, 717, 735, 806
See application file for complete search history.

(56) References Cited

U.S. PATENT DOCUMENTS

| 4,488,909 A | * | 12/1984 | Galer et al. ................. 106/695 |
| 5,879,445 A | * | 3/1999 | Guicquero et al. ......... 106/696 |
| 6,641,658 B1 | * | 11/2003 | Dubey ........................ 106/705 |

FOREIGN PATENT DOCUMENTS

| EP | 0 769 482 | 4/1997 |
| EP | 0 838 444 | 4/1998 |
| FR | 2 696 736 | 4/1994 |
| FR | 2 763 063 | 11/1998 |
| FR | 2 763 065 | 11/1998 |

* cited by examiner

Primary Examiner—Anthony J. Green
(74) Attorney, Agent, or Firm—Young & Thompson

(57) ABSTRACT

A binder for self-compacting concrete includes, in dry weight of the-binder, 70 to 90% of Portland cement, 4 to 16% of calcium aluminate, 4 to 14% of calcium sulphate, an accelerator and a retarder, 0 to 2% of Ca(OH)2 and at least an additive with a water reducer. The calcium sulphate is in the form of anhydrite and the water reducer has at least a superplasticizer consisting of a water soluble or water dispersible organic compound, having at least an amino-di (alkylene-phosphonic) group and at least a polyoxyalkylated chain or at least one of its salts.

18 Claims, No Drawings

QUICK BINDER FOR SELF COMPACTING CONCRETE, USE AND APPLICATION OF SAME

The present invention relates to a quick binder for self-compacting concrete as well as a use in a concrete and to applications of such a quick binder for self-compacting concrete.

Quick binders for self-compacting concrete are quick setting and hardening binders, i.e. quickly hardening once processed and having important short-term mechanical features. Such mortar or concrete type binders preferably have a compression strength Rc of at least 8 MPa at 6 hours (or even at 4 hours) and of at least 24 MPa at 24 hours. Such self-compacting concretes should have a workability time of minimum one hour and maximum one and a half hours to two hours, without needing any vibration. The workability is measured by the sagging height at the Abrams' cone (according to the French standard NF P 18-451, December 1981) and a concrete is considered as being workable when said sagging is of at least 15 cm.

The invention is more particularly aimed at the urgent repair of structures or at the temporary support of tunnels, galleries or other similar structures.

It is understood by "urgent repair" any repair work that should be started as soon as possible in order to allow for a damaged structure to be operated again. Such a repair work most often relates to roads or motorways, airport runways, etc. In the presence of high temperatures, like in hot countries, where the temperature is likely to exceed 30° C., it is particularly difficult to convey a quick binder mixture for self-compacting concrete while maintaining the fluidity thereof during transportation, up to its applications. Moreover, at room temperatures of about 30–40° C., which are found in many hot countries, the known quick binders for self-compacting concrete have a quick setting start, making the workability thereof difficult. Such a difficulty is found, more particularly, in road repairs, because of the acceleration created by the high temperature.

It is understood by "temporary support" of a tunnel, a more or less thick temporary coating on the walls and the roof of such structures to be supported. Such a coating is required for strengthening the structure walls and thereby protecting the personnel, while waiting for the concrete or voussoir final coating to be set up. The support is accordingly intended for lasting only some time (up to two months maximum) and avoids metal vaults to be provided, which considerably delays the structure building duration.

In tunnel building, the current trend rather consists in using the concrete preparation wet way (mixing the binder with water before application) which involves less environmental problems for the personnel.

Additionally, some underground drilling techniques such as the groove precutting technique, known as "PERFOREX", are currently used successfully. Such a technique makes use of the projection of an accelerated binder into an often long and narrow groove (about 20 to 30 cm thickness by 3 to 4 meters long on the whole cylindrical part of an underground tunnel). It is nowadays performed with "LP2" type quick binders for self-compacting concrete of the Applicant, based on slag and calcium aluminates.

However, such binders do not allow for the groove to be filled through pumping and casting satisfactorily.

Both applications in urgent repair and in temporary support work require binders with similar specificities: they must have an adapted rheology, preferably involving a workability duration of one hour minimum and of one and a half hours to two hours maximum and a very quick hardening of the repaired elements or temporary vaults.

On the other hand, such binders must be preferably strong, i.e. having a reproducible behaviour in a wide range of conditions. Thus, their behaviour should depend as little as possible on the weather conditions (temperature and/or humidity) and/or the raw material variations.

Additionally, it is desired that such binders should be easily worked and as economical as possible.

The European patent application EP-A1-0,769,482 discloses a material to be projected comprising a concrete mortar adapted for supporting the walls of a tunnel. Such a material has a composition comprising concrete, for example Portland concrete, gypsum and calcium aluminate. Preferably, a water reducing agent is added in order to improve the concrete mortar fluidity. The gypsum and calcium aluminate vary in proportions ranging from 0 to 25% relative to the concrete.

The material disclosed in said document, in the numerous embodiments thereof, does not meet the above-mentioned specificities for an urgent repair or a temporary support of a structure. In particular, such a material undergoes nearly an instantaneous stiffening when the whole components of the composition thereof are mixed. Moreover, the disclosed compositions are necessarily worked by projection and are little adapted for a casting and/or a pumping operation. In particular, they are not self-compacting.

The invention relates to a quick binder for self-compacting concrete which can have a high workability duration, more particularly ranging from one hour to one hour and a half or from one hour to two hours. It is meant by "workability duration" the fluidity holding duration corresponding to the setting start time.

Both properties of fluidity holding and high strengths at short term, being apparently incompatible, make it more particularly possible to make a binder composition in a concrete works and to convey it thereafter to a building site using a concrete mixer truck, the composition hardening quickly once processed. Such binder qualities also enable to pump it mechanically because of its fluidity and to cast it in tunnel grooves while obtaining a quick hardening.

The invention relates to such a mortar or concrete type binder adapted to have a compression strength in the order of 8 MPa at 6 hours, even at 4 hours, and of 24 MPa at 24 hours, measured on cylindrical test tubes of 16 cm×32 cm size.

The quick binder for self-compacting concrete according to the invention can also be easily pumpable ou castable, more particularly without vibration (self-compacting concrete), which makes it particularly adapted for temporarily supporting galleries or tunnels.

The binder according to the invention for self-compacting concrete can allow for an easy and economical processing.

The invention also relates to the use of the quick binder for self-compacting concrete according to the invention in a concrete, and to the applications of such a quick binder for self-compacting concrete to a temporary support or an urgent repair of a structure, including in room temperature conditions higher than 25° C.

To this end, the invention relates to a quick binder for self-compacting concrete comprising, based on the binder dry weight:
  70 to 90% Portland cement,
  4 to 16% calcium aluminate,
  4 to 14% calcium sulphate in an anhydrite form,
  an accelerator and a retarder, preferably citric acid and sodium carbonate, at least one adjuvant comprising a water reducer.

According to the invention:

0 to 2% hydrated lime $Ca(OH)_2$ may be added, the water reducer comprises at least a superplasticizer made of a water soluble or water dispersible organic compound, comprising at least an amino-di(alkylenephosphonic) group and at least a polyoxyalkylated chain or at least one of its salts.

The binder according to the invention is thus distinct from the material mentioned in EP-769,482 in that the water reducer comprises one or more superplasticizers such as defined hereabove and the optional presence of lime.

Such a new composition makes it possible to solve the abovementioned problems, and in particular, the possibility to have a higher workability at one hour, preferably from 1 hour and a half to 2 hours, to pump the concrete by means of our self-compacting formulation, while having very high mechanical compression strengths at 6 hours and at 24 hours (8 MPa at 6 hours and, preferably, 8 MPa at 4 hours, and 24 MPa at 24 hours), including at temperatures ranging from 10 to 35° C.

In fact, surprisingly, the quick binder for self-compacting concrete according to the invention makes it possible both to delay the setting start sufficiently and to obtain excellent quick hardening qualities.

The workability duration is a basic parameter. It enables to prepare the composition in a concrete works which allows to avoid handling raw materials on the building site, often jammed, and therefore to avoid accidents. It also allows for conveying the composition, for example in a concrete mixer truck, thus simplifying the building site logistics.

The composition according to the invention also has the further advantage to be pumpable with the building site usual means, such a composition being castable and self-compacting. Thus, the processing thereof is simplified, since it can be well cast, even without vibration, while meeting the high mechanical strength criterion at short term.

Also, another important property of the composition is its robustness, i.e. its ability to bear the usual variations in the granulates while maintaining the mechanical strength in the final product. Such variations are frequently found in ready-to-use concrete works.

Another advantage is the absence of sweating or segregation of the concrete compositions made with various usual sands and granulates, even with sagging measurements at the Abrams' cone of 24 cm.

Moreover, the binder according to the invention for self-compacting concrete may be processed in varying weather conditions, from 10 to 35° C. for example, while meeting the criterion requiring high mechanical strengths at short term and having a satisfactory workability.

The binder may be supplied:

either in the form of a dry premix, for the part of the components apart from liquid additives (and optionally, alternatively, apart from sand and aggregates), in bags or in bulk, for directly supplying the structure building site where mixing with water will occur, or in the form of concrete for "concrete mixer trucks" from the usual concrete works.

Preferably, the adjuvants comprise a setting accelerator, preferably consisting in 0.5 to 2.5% in dry weight of the binder. Such a setting accelerator advantageously comprises sodium carbonate.

The adjuvants also preferably comprise a setting retarder, more preferably accounting for 0.5 to 2.5% in dry weight of the binder. Such a setting retarder advantageously comprises citric acid, preferably in a monohydrated form.

The anhydrite advantageously has a purity higher than 90% and advantageously comprises anhydrite II.

Moreover, the calcium aluminate preferably has a minimum alumina content of 50%.

Preferably, the superplasticizer accounts for approximatively 1.5% in dry weight of the binder.

Such a superplasticizer is preferably a compound (I) or a salt of the compound (I), such a compound (I) having the formula:

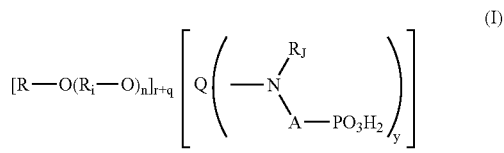

wherein:

R is a hydrogen atom or a monovalent hydrocarbon group, saturated or unsaturated, comprising 1 to 18 carbon atoms and optionally, one or more heteroatoms; R preferably being a hydrogen atom or a monovalent hydrocarbon group, saturated or unsaturated, comprising 1 to 4 carbon atoms, 50 to 100% of the $R_i$ are ethylene, 0 to 50% of the other optional $R_i$ are similar or different to each other and represent an alkylene such as ethylene, propylene, butylene, amylene, octylene or cyclohexene, or an arylene such as styrene or methylstyrene, the $R_j$ optionally comprising one or more heteroatoms, Q is a hydrocarbon group having 2 to 18 carbon atoms and optionally, one or more heteroatoms, A is an alkylene group having 1 to 3 carbon atoms, A preferably representing the methylene group, the $R_j$ are similar or different to each other and can be selected amongst:

the $A$—$PO_3H_2$ group, A having the above-mentioned meaning, and the group:

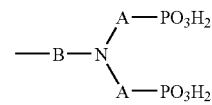

—B meaning an alkylene group comprising 2 to 8 carbon atoms, B preferably representing ethylene or propylene, A having the abovementioned meaning, "n" is an number ranging from 20 to 250, "r" is the number of [R—O($R_i$—O)$_n$] groups carried by all the $R_j$, "q" is the number of [R—O($R_i$—O)$_n$] groups carried by Q, the "r+q" sum is at the most equal to 3, "y" is an integer equal to 1 or 2, Q, N and the $R_j$ can form together one or more rings, such (a) cycle(s) being additionally likely to comprise one or more other heteroatoms.

The salts of the compound (I) may be stoichiometric or not, mixed or not, and are made of alkaline metals, alkaline earth metals, amines or quaternary ammonium.

The compounds (I) are present in a form likely to vary from the liquid to the solid form, through the waxy form.

The category of such superplasticizers implemented in the invention is generally known per se as a fluidizing agent for aqueous slurries of mineral particles and hydraulic binder pastes, and is disclosed in FR-A-2,696,736. Additionally, a method for preparing such a fluidizing agent is disclosed in FRA-2,689,895. Reference is more particularly made to FR-A-2,696,736 for a detailed description of such a category of compounds (I) and of the salts of such compounds (I).

The superplasticizer such as defined hereabove advantageously has the following characteristics, either taken separately or in association, depending on all their technically possible combinations:

R is a hydrogen atom,

R is a monovalent hydrocarbon group, saturated or unsaturated, comprising 1 to 4 carbon atoms, the $R_i$ groups are selected amongst ethylene and propylene, $R_i$ is predominantly ethylene, the number of ethylene blocks corresponding to $R_i$ being sufficient to hold the water soluble or the water dispersible character of the compound (I), Q is a hydrocarbon group comprising 2 to 12 carbon atoms, and preferably 2 to 6 carbon atoms, and preferably represents ethylene and/or propylene, those latter being advantageously present in an amount of 95% in moles, the complement being made of other monomers, such as cyclohexene and n-hexene, the alkylidene A group comprises 1 to 3 carbon atoms, A is the methylene group, the $R_j$ group is the $—CH_2—PO_3H_2$, optionally salified, or the $—C_2H_4N\ (CH_2—PO_3H_2)_2$ group, optionally salified, or the $C_3H_6N\ (CH_2—PO_3H_2)_2$ optionally salified, the salts of the compound (I) are sodium, calcium, or diethanolamine salts, "n" ranges from 20 to 250, preferably from 30 to 150 and more preferably from 50 to 100, the "r+q" sum is less then 3 and preferably equal to 1, "y" is equal to 1.

Advantageously, the compound (I) used as a superplasticizer in the hydraulic binder according to the invention for self-compacting concrete comprises one or more of the following characteristics:

(i) at least 50% of the $R_i$'s are ethylene and the other optional $R_i$'s are propylene, (ii) $R_j$ is selected amongst the $—CH_2—PO_3H_2$ groups, optionally salified, (iii) $—C_2—H_4N\ (CH_2—PO_3H_2)_2$ and $—C_3H_6N\ (CH_2—PO_3H_2)_2$.

Very good results have been obtained with a disphonated compound (I) wherein $R_i$ is ethylene, $R_j$ is $CH_2—PO_3H_2$, "n" ranges from 30 to 150 (including limits), preferably from 50 to 100 (including limits), the "r+q" sum is equal to 1 and "y" is equal to 1.

A compound which has exhibited very good results has the formula (II):

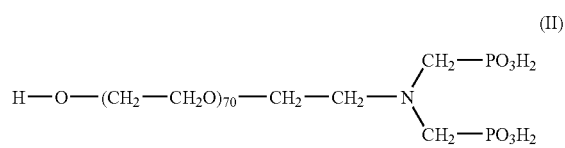

(II)

or one of the salts thereof.

Advantageously, the Portland cement is a quick cement (so-called of "R" type), preferably ground to a fineness of at least 4000 cm²/g.

Preferably, the cement is of HRI type ("Haute Resistance Initiale"):

The invention also relates to the use of a binder according to the invention for self-compacting concrete in a concrete.

The composition may then be supplemented with conventional granulates (sands, gravels and/or pebbles).

Preferably, the concrete has a granulometry less than or equal to 20 mm. The composition may then be thereby easily pumped.

Moreover, the concrete has advantageously an efficient water weight ratio on dry binder ranging from 0.35 to 0.4 and has advantageously a dry weight ratio of granulates on the binder ranging from 4 to 5.

The invention also relates to applications of a quick binder for self-compacting concrete according to the invention for filling a groove through pumping and/or casting for a temporarily support of a structure and for an urgent repair of a damaged structure, as well as its applications to an implementation in room temperature conditions higher than 25° C.

The invention will be illustrated more in details using the following, but not limitative, examples.

EXAMPLE 1

| Formulation for supporting galleries | |
|---|---|
| Binder composition: | |
| Portland cement type CEMI 52, 5 R from Saint Pierre La Cour | 81.85% |
| ICI anhydrite (source $CaSO_4$ > 90%) | 8.75% |
| Calcium aluminate type Secar 51 BTF from Lafarge Aluminates | 7% |
| $Na_2CO_3$ sodium carbonate | 1.7% |
| Monohydrated citric acid | 0.7% |
| Concrete composition: | |
| 0–5 sand | 754 kg/m³ |
| 5–12 gravel | 372 kg/m³ |
| 12–20 pebbles | 723 kg/m³ |
| Binder according to above-mentioned composition kg/m³ | 400 |
| Water (efficient water/binder = 0.40) | 160 l |
| Aminophosphonate superplasticizer commercialized under the trade mark Optima 100 added to the concrete in a liquid form | 6 l |

The following performances are obtained on the concrete (raw materials at about 14° C.).

A workability holding has been observed for 1 h 15 (it is therefore possible to prepare in a concrete works a ready-to-use concrete followed by transportation in a concrete mixer truck).

The workability is measured through sagging at the Abrams' cone at the following T times (in minutes):

T0: 23 cm
T15: 23 cm
T45: 20 cm
T60: 18 cm
T75: 16.5 cm

At T 90, the product has lost its whole plasticity.

The setting is evaluated at 1 h55.

Such a concrete may be laid down with no vibration (self-compacting concrete).

No sweating nor segregation is observed.

The compression strengths (Rc) are measured on test tubes in a size of 16 cm×32 cm and represented in table I (with "d" standing for day).

TABLE 1

| Deadline | With vibration | Without vibration |
|---|---|---|
| 4 h (MPa) | 8.9–11.3 | 10.8–14.9 |
| 5 h (MPa) | 13.2–15.5 | 13.7–15.5 |
| 24 h (MPa) | 28.1 | 27.1–30.9 |
| 28 d (MPa) | 47.25 | 50.35 |
| Cleaving test at 28 days (MPa) | 4.2 | 4.8 |

The established mechanical strength criteria are indeed met, while having the required workability conditions.

No disorder is observed on the test tube surface, their curing is not necessary.

EXAMPLE 2

| Formulation for an urgent repair | |
|---|---|
| Binder composition: | |
| Cement type HPR Siam 3 ASTM type 3 from Siam Cement | 78.2% |
| ICI anhydrite (CaSO$_4$ > 90% source) | 10% |
| Secar 51 (source Al$_2$O$_3$ > 52.5%; CaO > 39%) from Lafarge | 8% |
| Na$_2$CO$_3$ sodium carbonate | 1.9% |
| Citric acid | 1.9% |
| "Optima 100" aminophosphonates added to the concrete in a liquid form | 1.5% |
| Concrete composition: | |
| 0–5 sand | 733 kg/m$^3$ |
| 5–12 gravel | 478 kg/m$^3$ |
| 12–20 pebbles | 684 kg/m$^3$ |
| Binder according to above-mentioned composition | 400 kg/m$^3$ |
| Water (efficient water/binder = 0.40) | 160 l |

The following performances are obtained on a concrete at 30° C.

A workability holding is observed for 1 h 45.

No sweating nor segregation is observed.

The workability is measured through sagging at the Abrams' cone at the following T times (in minutes):

T0: 17 cm
T60: 16 cm
T90: 7 cm
T105: 5 cm

The compression strengths (Rc) are measured on cubes in a size of 15 cm×15 cm (the obtained results up to 24 hours are on non unmoulded test tubes).

Rc 33.8 MPa at 6 hours
Rc 48.1 MPa at 24 hours
Rc>60 MPa at 7 days

The established criteria of mechanical strengths are indeed met, while having the required workability conditions.

No disorder is observed on the test tube surface, their curing is not necessary.

EXAMPLE 3

This example is a comparison of a composition according to the invention with a prior art composition, and in particular, a composition according to the teachings of the European patent EP A1-0,769,482.

All the dry components are preliminarily mixed, whereupon, water containing the superplasticizer is added.

| Composition according to the invention (g) | | Composition-ex. 12 EP-A1-0,769,482 (g) | |
|---|---|---|---|
| 0–4 mm Palvadeau sand | 1986 | 0–4 mm Palvadeau sand | 1986 |
| SPLC 52.5 R Portland cement | 857 | SPLC 52.5 R Portland cement | 857 |
| Secar 51 | 85.7 | Secar 51 | 85.7 |
| ICI anhydrite | 85.7 | Anhydrite | 85.7 |
| Na$_2$CHO$_3$ | 23.1 | Sodium bisulfite | 17.14 |
| Ca(OH)$_2$ | 10.9 | Water | 384.8 |
| Citric acid | 4.95 | Disal N superplasticizer | 16.5 |
| Water | 384.8 | | |
| Optima 100 superplasticizer | 16.5 | | |

For the composition of example 12 from patent EP-A1-0,769,482, the aluminous cement/Portland cement, gypsum/Portland cement and sodium bisulfide/Portland cement ratios are those described in example 12 of the patent.

Rheological Behaviour, Self-spreading Measurement, Modified ASTM C230 Test

| | Rheology | |
|---|---|---|
| | Composition according to the invention | Composition according to EP-A1-0,769,482 |
| Minutes | ASTM self-spreading in % | |
| 15 | 170 | 0 |
| 30 | 160 | 0 |
| 45 | 145 | 0 |
| 60 | 130 | 0 |

The obtained results show that:

with a prior art composition such as that from example 12 of patent EP-A1-0,769,482, a nearly immediate stiffening is obtained as soon as all the components are mixed; such a rheological behaviour is being sought for all the materials intended to be applied by projection;

with a composition according to this invention, close to the abovementioned one, but comprising a superplasticizer made of at least a water soluble organic compound, comprising at least an amino-di(alkylene-phosphonic) group Optima 100 commercialized by Chryso SAS—and at least a polyoxyalkylated chain, a very fluidic material is obtained having a good rheology holding over time.

The invention claimed is:

1. A quick binder for self-compacting concrete comprising by weight, based on the weight of the quick binder in a dry state:

70 to 90% Portland cement,
4 to 16% calcium aluminate,
4 to 14% calcium sulphate in an anhydrite form,
a setting accelerator and a setting retarder,
at least an adjuvant comprising a water reducer, wherein:
the water reducer comprises at least a superplasticizer made of a water soluble or water dispersible organic compound, comprising at least an amino-di(alkylenephosphonic) group and at least a polyoxyalkylated chain, and wherein the superplasticizer is a compound (I) or a salt of the compound (I), said compound (I) having the formula:

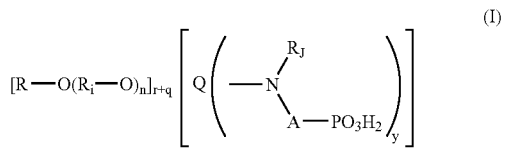

wherein,

R is a hydrogen atom or a monovalent hydrocarbon group, saturated or unsaturated, comprising 1 to 18 carbon atoms and optionally, one or more heteroatoms; 50 to 100% of the $R_i$ are ethylene, 0 to 50% of the $R_i$ are similar or different to each other and represent an alkylene selected from propylene, butylene, amylene, octylene or cyclohexene, or an arylene selected from styrene or methylstyrene, the $R_i$ optionally comprising one or more heteroatoms, Q is a hydrocarbon group having 2 to 18 carbons atoms and optionally, one or more heteroatoms, A is an alkylene group having 1 to 3 carbon atoms, the $R_j$ are similar or different to each other and are selected from:

*the A—$PO_3H_2$ group, wherein A is an alkylene group having 1 to 3 carbon atoms,

*and the group:

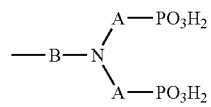

—B is an alkylene group comprising 2 to 8 carbon atoms,
A is an alkylene group having 1 to 3 carbon atoms,
"n" is an number ranging from 20 to 250,
"r" is the number of [R—O($R_i$—O)$_n$] groups carried by all the $R_j$,
"g" is the number of [R—O($R_i$—O)$_n$] groups carried by Q,
the "r+q" sum is at the most equal to 3,
"y" is an integer equal to 1 or 2,
Q, N and the $R_j$ can form together one or more rings, said ring or rings optionally comprising one or more heteroatoms.

2. The quick binder for self-compacting concrete according to claim 1, further comprising 2% of hydrated lime $(Ca(OH)_2$.

3. The quick binder for self-compacting concrete according to claim 1, wherein the setting accelerator comprises sodium carbonate and the setting retarder comprises citric acid.

4. The quick binder for self-compacting concrete according to claim 1, wherein the setting retarder accounts for 0.5 to 2.5% by weight and the setting accelerator accounts for 0.5 to 2.5% by weight, based on the total weight of the quick binder.

5. The quick binder for self-compacting concrete according to claim 3, wherein the citric acid is in a monohydrated form.

6. The quick binder for self-compacting concrete according to claim 1, wherein the calcium sulphate in anhydrite form is an anhydrite with a hardness higher than 90%.

7. The quick binder for self-compacting concrete according to claim 6, wherein the anhydrite comprises anhydrite II.

8. The quick binder for self-compacting concrete according to claim 1, wherein the calcium aluminate has a minimum alumina content of 50%.

9. The quick binder according to claim 1, wherein said superplasticizer accounts for approximately 1.5% in dry weight of the binder.

10. The quick binder for self-compacting concrete according to claim 1, wherein a superplasticizer is the compound having the formula (II):

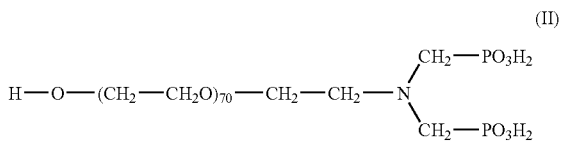

or one of the salts thereof.

11. The quick binder for self-compacting concrete according to claim 1, wherein the Portland cement is a quick cement ground to a fineness higher than or equal to 4000 $cm^2/g$.

12. A process for making a self-compacting concrete having a compression strength of 8 MPa minimum at 6 hours and at least 24 MPa at 24 hours, with a workability of 1 hour minimum, which comprises adding to the self-compacting concrete a binder according to claim 1.

13. The process according to claim 12, wherein said concrete has a compression strength of 8 MPa at 4 hours and of at least 24 MPa at 24 hours.

14. The process according to claim 12, wherein said concrete has a workability of one and half hour to 2 hours.

15. The process according to claim 12, wherein the concrete has a ratio of efficient water weight on dry binder ranging from 0.35 to 0.4.

16. A self-compacting concrete comprising the quick binder according to claim 1, having a compression strength of 8 MPa minimum at 6 hours and of at least 24 MPa at 24 hours, with a workability of 1 hour minimum.

17. The self-compacting concrete according to claim 16, wherein the concrete has a compression strength of 8 MPa at 4 hours and of at least 24 MPa at 24 hours.

18. The self-compacting concrete according to claim 16, wherein the concrete has a workability of 1 and half hour to 2 hours.

* * * * *

UNITED STATES PATENT AND TRADEMARK OFFICE
CERTIFICATE OF CORRECTION

PATENT NO. : 7,029,527 B2
APPLICATION NO. : 10/311865
DATED : April 18, 2006
INVENTOR(S) : Laurent Gaudry et al.

It is certified that error appears in the above-identified patent and that said Letters Patent is hereby corrected as shown below:

On the title page, amend Item (75) to read as follows:

--(75)  Inventors:  Laurent Gaudry, l'Isle d'Abeau (FR);
Christian Marez, Bourgoin Jallieu (FR);
Catherine Revais, Diemoz (FR)--.

Signed and Sealed this

First Day of August, 2006

JON W. DUDAS
*Director of the United States Patent and Trademark Office*